(12) United States Patent
Ido et al.

(10) Patent No.: US 8,034,299 B2
(45) Date of Patent: Oct. 11, 2011

(54) CATALYST CARRIER AND EXHAUST GAS TREATMENT APPARATUS

(75) Inventors: Takahiko Ido, Ibi-gun (JP); Kazushige Ohno, Ibi-gun (JP)

(73) Assignee: Ibiden Co., Ltd., Ogaki-shi (JP)

( * ) Notice: Subject to any disclaimer, the term of this patent is extended or adjusted under 35 U.S.C. 154(b) by 930 days.

(21) Appl. No.: 11/942,559

(22) Filed: Nov. 19, 2007

(65) Prior Publication Data

US 2008/0241008 A1    Oct. 2, 2008

(30) Foreign Application Priority Data

Mar. 30, 2007 (WO) .................. PCT/JP2007/057254

(51) Int. Cl.
*B01D 50/00* (2006.01)
(52) U.S. Cl. ........................................ 422/180; 422/177
(58) Field of Classification Search .................. 422/177, 422/180
See application file for complete search history.

(56) References Cited

U.S. PATENT DOCUMENTS

| | | | |
|---|---|---|---|
| 4,278,639 A * | 7/1981 | Tadokoro et al. ............. | 422/171 |
| 4,329,162 A | 5/1982 | Pitcher, Jr. | |
| 4,335,023 A | 6/1982 | Dettling et al. | |
| 5,916,530 A * | 6/1999 | Maus et al. .................... | 422/179 |
| 6,159,431 A | 12/2000 | Inoue et al. | |
| 2002/0197193 A1 | 12/2002 | Harada et al. | |
| 2004/0142145 A1 | 7/2004 | Hashimoto et al. | |
| 2007/0130897 A1 | 6/2007 | Sakaguchi et al. | |
| 2008/0118701 A1 | 5/2008 | Ohno et al. | |
| 2008/0119355 A1 | 5/2008 | Ohno et al. | |
| 2008/0176028 A1 | 7/2008 | Ohno et al. | |
| 2008/0187713 A1 | 8/2008 | Ohno et al. | |
| 2008/0241003 A1 | 10/2008 | Ido et al. | |
| 2008/0241005 A1 | 10/2008 | Ido et al. | |
| 2008/0260991 A1 | 10/2008 | Konstandopoulos et al. | |

FOREIGN PATENT DOCUMENTS

| | | |
|---|---|---|
| EP | 0854123 | 7/1998 |
| EP | 1736220 | 12/2006 |
| EP | 1849754 | 10/2007 |
| JP | 62-234552 | 10/1987 |
| JP | 10-264125 | 10/1998 |
| JP | 2001-190916 | 7/2001 |
| JP | 2002-046117 | 2/2002 |
| JP | 2003-010616 | 1/2003 |
| JP | 2004-154718 | 6/2004 |

(Continued)

*Primary Examiner* — Tom Duong
(74) *Attorney, Agent, or Firm* — Ditthavong Mori & Steiner, P.C.

(57) ABSTRACT

A catalyst carrier including a ceramic block having two open faces, an outer peripheral surface, and multiple cells divided by a cell wall and extending between the open faces. The ceramic block has multiple honeycomb units combined by interposing an adhesive layer, where the honeycomb units include an outer-peripheral-side honeycomb unit and a center-side honeycomb unit combined to form the outer peripheral part and the center part, respectively, of the block. The outer-peripheral-side honeycomb unit has an outer peripheral cell wall forming the outer peripheral surface of the outer-peripheral-side honeycomb unit. The outer peripheral cell wall includes an outermost peripheral cell wall forming part of the outer peripheral surface of the block. A cell of the outer-peripheral-side honeycomb unit in contact with the outermost peripheral cell wall thereof has a corner part having a curved surface, where the corner part is on the side contacting the outermost peripheral cell wall.

25 Claims, 8 Drawing Sheets

FOREIGN PATENT DOCUMENTS

| JP | 2005-349378 | 12/2005 |
| JP | 2006-223983 | 8/2006 |
| WO | WO 2007/058006 | 5/2007 |
| WO | WO 2007/061457 | 5/2007 |

* cited by examiner

CATALYST CARRIER AND EXHAUST GAS TREATMENT APPARATUS

CROSS-REFERENCE TO RELATED APPLICATION

The present application is based on PCT International Application No. PCT/JP2007/057254, filed on Mar. 30, 2007, the entire contents of which are hereby incorporated by reference.

BACKGROUND OF THE INVENTION

1. Field of the Invention

The present invention relates to a catalyst carrier and an exhaust gas treatment apparatus.

2. Description of the Related Art

There have been proposed a variety of exhaust gas treatment apparatuses that convert harmful gases contained in exhaust gas discharged from the internal combustion engines of vehicles such as automobiles, buses, and trucks, construction machines, and the like.

Common exhaust gas treatment apparatuses generally have a structure where, for example, a metal casing is provided in an exhaust pipe connected to the exhaust gas manifold of an engine and a catalyst carrier having a honeycomb structure is placed in the casing.

This catalyst carrier is formed of, for example, a ceramic block having two end faces and a coat layer provided on the outer peripheral surface of the ceramic block, excluding its end faces, as described in JP2005-349378A. Further, the ceramic block is formed by combining multiple porous ceramic units made of γ alumina or the like by interposing an adhesive layer. Each porous ceramic unit has multiple cells separated by a cell wall and extending in a longitudinal direction. A catalyst such as Pt is provided on the cell wall. When exhaust gas is caused to flow through such a catalyst carrier, harmful gases contained in the exhaust gas, such as CO, HC, and NOx, are converted by the catalyst provided on the cell wall by catalytic reaction, so that the exhaust gas can be converted.

In the case of manufacturing such a catalyst carrier, first, a predetermined number of porous ceramic units are combined by interposing an adhesive layer, and thereafter, this united body is cut into a desired shape, so that a ceramic block is manufactured. Thereafter, a coat layer is provided on the outer peripheral surface (that is, cut surface) of the ceramic block. According to such a method, however, the porous ceramic units have considerable portions thereof cut, removed, and discarded at the time of manufacturing the ceramic block, which causes the problem of increased manufacturing costs. Further, the number of processes increases because of the above-described process of cutting the united body, which causes the problem of reduced productivity.

In order to deal with such problems, there has been proposed, although in the field of DPFs (Diesel Particulate Filters), the technique of manufacturing a ceramic block of a desired shape directly without going through a cutting process by preparing multiple porous ceramic units of various shapes and combining them by interposing an adhesive layer (JP2004-154718A). Such a DPF manufacturing method can also be applied to the manufacture of a catalyst carrier. The entire contents of JP2005-349378A and JP2004-154718A are hereby incorporated by reference.

SUMMARY OF THE INVENTION

A first configuration of a catalyst carrier of the present invention includes a ceramic block having two open faces and an outer peripheral surface, where the ceramic block has a plurality of cells divided by a cell wall and extending between the two open faces, and where the ceramic block has a plurality of honeycomb units combined by interposing an adhesive layer. The honeycomb units include an outer-peripheral-side honeycomb unit and a center-side honeycomb unit combined to form an outer peripheral part and a center part, respectively, of the ceramic block. The outer-peripheral-side honeycomb unit has an outer peripheral cell wall forming an outer peripheral surface of the outer-peripheral-side honeycomb unit, the outer peripheral cell wall includes an outermost peripheral cell wall forming a part of the outer peripheral surface of the ceramic block, and a cell of the outer-peripheral-side honeycomb unit in contact with the outermost peripheral cell wall thereof has a corner part having a curved surface. The corner part is on a side contacting the outermost peripheral cell wall.

Here, the center-side honeycomb unit may have an outer peripheral cell wall forming an outer peripheral surface of the center-side honeycomb unit, and a cell of the center-side honeycomb unit in contact with the outer peripheral cell wall thereof may have a corner part having a curved surface, where the corner part is on a side contacting the outer peripheral cell wall.

Here, the center-side honeycomb unit may have an interior cell wall not forming the outer peripheral surface thereof, the interior cell wall having a thickness in a range of approximately 0.1 mm through approximately 0.4 mm.

Here, the honeycomb units of the ceramic block may have three kinds of shapes.

A second configuration of a catalyst carrier of the present invention includes a ceramic block having two open faces and an outer peripheral surface, where the ceramic block has a plurality of cells divided by a cell wall and extending between the two open faces, and where the ceramic block includes a plurality of outer-peripheral-side honeycomb units combined by interposing an adhesive layer so as to each form a part of the outer peripheral surface of the ceramic block. The outer-peripheral-side honeycomb units each have an outer peripheral cell wall forming an outer peripheral surface of the outer-peripheral-side honeycomb unit, the outer peripheral cell wall including an outermost peripheral cell wall forming the part of the outer peripheral surface of the ceramic block, and a cell of each of the outer-peripheral-side honeycomb units in contact with the outermost peripheral cell wall thereof has a corner part having a curved surface. The corner part is on a side contacting the outermost peripheral cell wall.

Here, the outermost peripheral cell wall may have a uniform thickness.

Here, a cell of the outer-peripheral-side honeycomb unit in contact with the outer peripheral cell wall thereof may have a corner part having a curved surface, where the corner part is on a side contacting the outer peripheral cell wall.

Here, the ceramic block may have a cylindrical shape, and the outer-peripheral-side honeycomb unit may have the outermost peripheral cell wall having a curved surface.

Here, the honeycomb units may include inorganic particles and at least one of inorganic fibers and whiskers.

Here, the inorganic particles may include at least one selected from the group consisting of alumina, silica, zirconia, titania, ceria, mullite, and zeolite, and the at least one of the inorganic fibers and the whiskers may include at least one selected from the group consisting of alumina, silica, silicon carbide, silica alumina, glass, potassium titanate, and aluminum borate.

Here, the outermost peripheral cell wall may have a thickness in a range of approximately 0.25 mm through approximately 0.50 mm.

Here, the outer-peripheral-side honeycomb unit may have an interior cell wall not forming the outer peripheral surface thereof, and the interior cell wall may have a thickness in a range of approximately 0.1 mm through approximately 0.4 mm.

Here, a catalyst may be carried on the catalyst carrier.

Here, a coat layer may be provided on the outer peripheral surface of the ceramic block.

An exhaust gas treatment apparatus for a vehicle of the present invention includes the above-described catalyst carrier of the first configuration, a metal casing housing the catalyst carrier, and a holding seal material provided between the catalyst carrier and the metal casing and holding the catalyst carrier.

An exhaust gas treatment apparatus for a vehicle of the present invention includes the above-described catalyst carrier of the second configuration, a metal casing housing the catalyst carrier, and a holding seal material provided between the catalyst carrier and the metal casing and holding the catalyst carrier.

BRIEF DESCRIPTION OF THE DRAWINGS

A more complete appreciation of the invention and many of the attendant advantages thereof will become readily apparent with reference to the following detailed description, particularly when considered in conjunction with the accompanying drawings, in which.

DETAILED DESCRIPTION OF THE PREFERRED EMBODIMENTS

Figure 1:
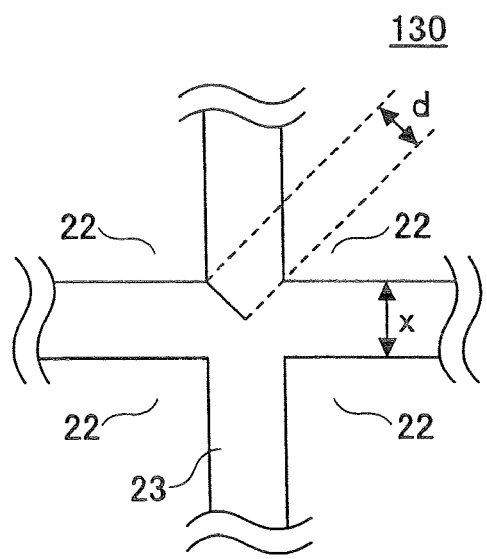
FIG. 1 is an enlarged cross-sectional view of a honeycomb unit in which the corner parts of cells do not have curved surfaces.

A description is given below, with reference to the accompanying drawings, of one or more embodiments of the present invention.

Embodiments of the present invention will be described hereinafter with reference to the accompanying drawings. In the following description, the constituent elements having substantially the same function and arrangement are denoted by the same reference numerals, and repetitive descriptions will be made only when necessary.

A catalyst carrier of the present invention includes a ceramic block having two open faces and an outer peripheral surface, the ceramic block having multiple cells divided by a cell wall and extending between the two open faces, wherein the ceramic block has multiple honeycomb units combined by interposing an adhesive layer, the honeycomb units including an outer-peripheral-side honeycomb unit and a center-side honeycomb unit combined to form the outer peripheral part and the center part, respectively, of the ceramic block, the outer-peripheral-side honeycomb unit has an outer peripheral cell wall forming the outer peripheral surface of the outer-peripheral-side honeycomb unit, the outer peripheral cell wall including an outermost peripheral cell wall forming a part of the outer peripheral surface of the ceramic block, and a cell of the outer-peripheral-side honeycomb unit in contact with the outermost peripheral cell wall thereof has a corner part having a curved surface, the corner part being on the side contacting the outermost peripheral cell wall.

Another catalyst carrier of the present invention includes a ceramic block having two open faces and an outer peripheral surface, the ceramic block having a plurality of cells divided by a cell wall and extending between the two open faces, wherein the ceramic block includes multiple outer-peripheral-side honeycomb units combined by interposing an adhesive layer so as to each form a part of the outer peripheral surface of the ceramic block, the outer-peripheral-side honeycomb units each having an outer peripheral cell wall forming the outer peripheral surface of the outer-peripheral-side honeycomb unit, the outer peripheral cell wall including an outermost peripheral cell wall forming the part of the outer peripheral surface of the ceramic block, and a cell of each of the outer-peripheral-side honeycomb units in contact with the outermost peripheral cell wall thereof has a corner part having a curved surface, the corner part being on the side contacting the outermost peripheral cell wall.

Further, an exhaust gas treatment apparatus for a vehicle of the present invention includes one of the above-described catalyst carriers, a metal casing housing the catalyst carrier, and a holding seal material provided between the catalyst carrier and the metal casing and holding the catalyst carrier.

According to an embodiment of the present invention, it is possible to obtain a catalyst carrier that has both high isostatic strength and a high conversion rate.

Figure 3:
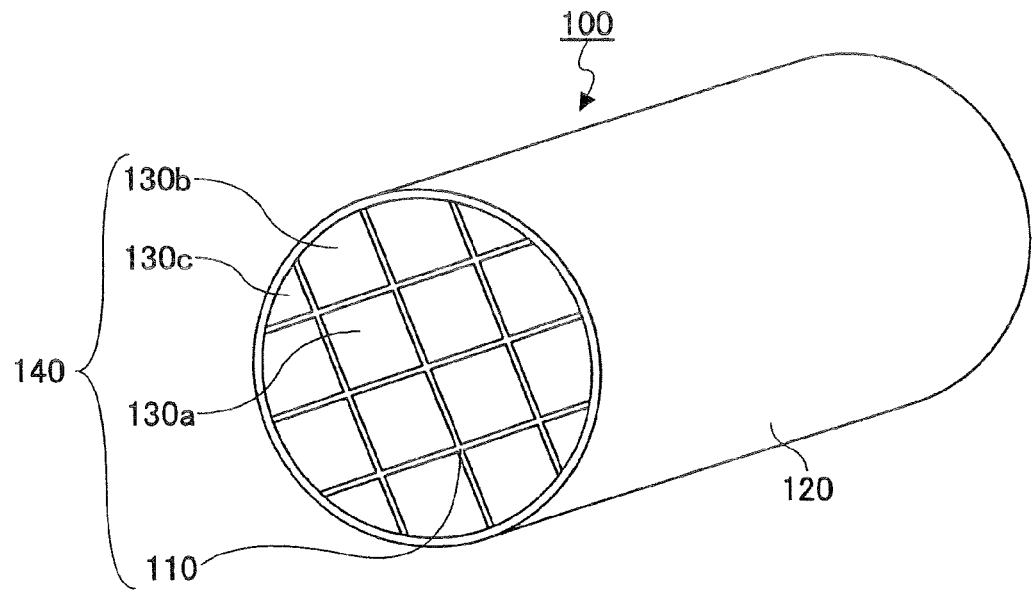
FIG. 3 is a schematic perspective view of a catalyst carrier according to an embodiment of the present invention.
Figure 4:
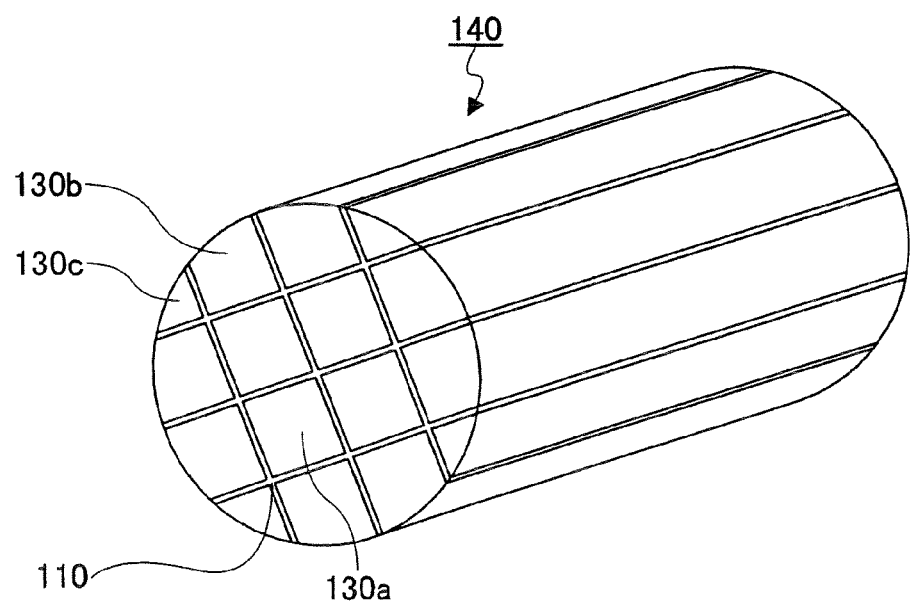
FIG. 4 is a schematic perspective view of a ceramic block forming the catalyst carrier according to the embodiment of the present invention.
Figure 5:
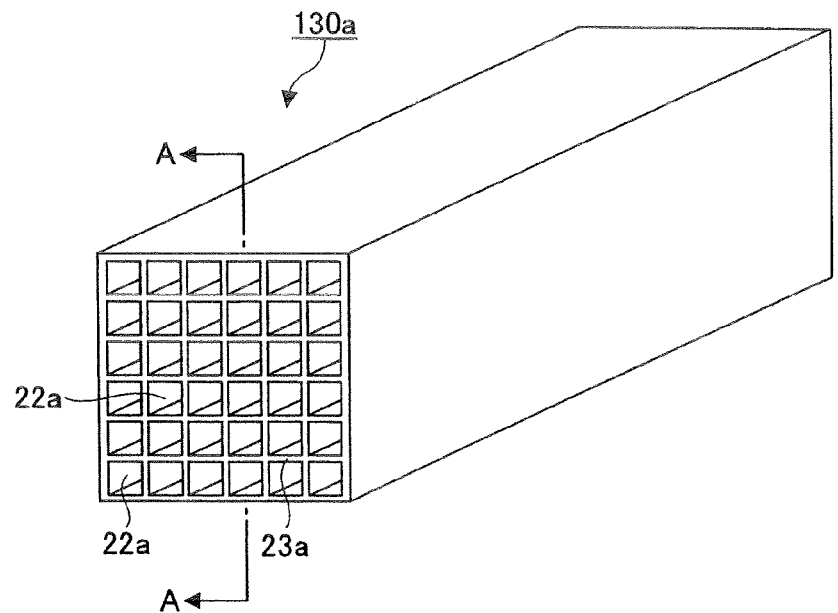
FIG. 5 is a schematic perspective view of a first honeycomb unit forming the catalyst carrier according to the embodiment of the present invention.
Figure 6:
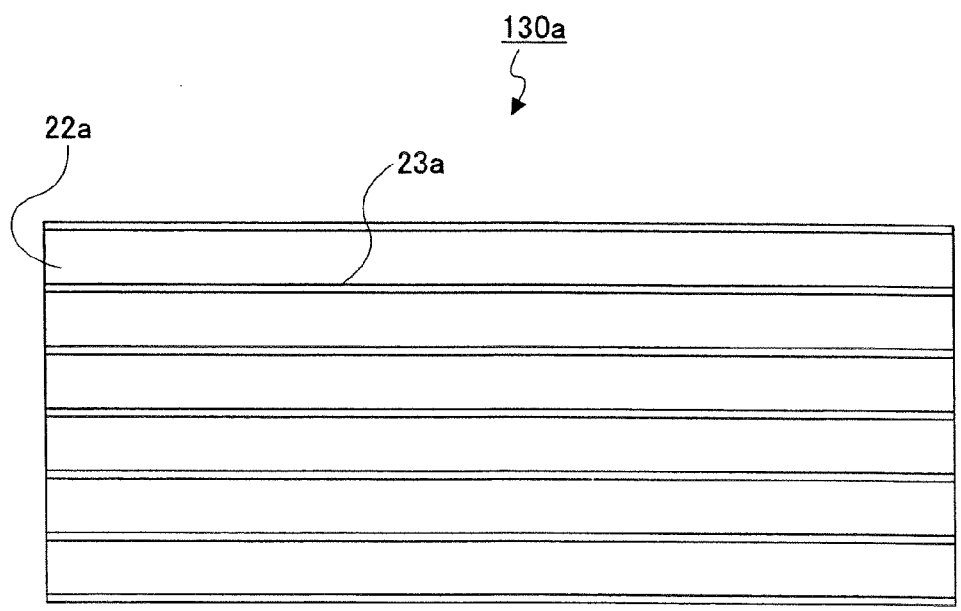
FIG. 6 is a schematic cross-sectional view of the first honeycomb unit of FIG. 5 taken along a plane extending longitudinally from line A-A in FIG. 5.
Figure 7:
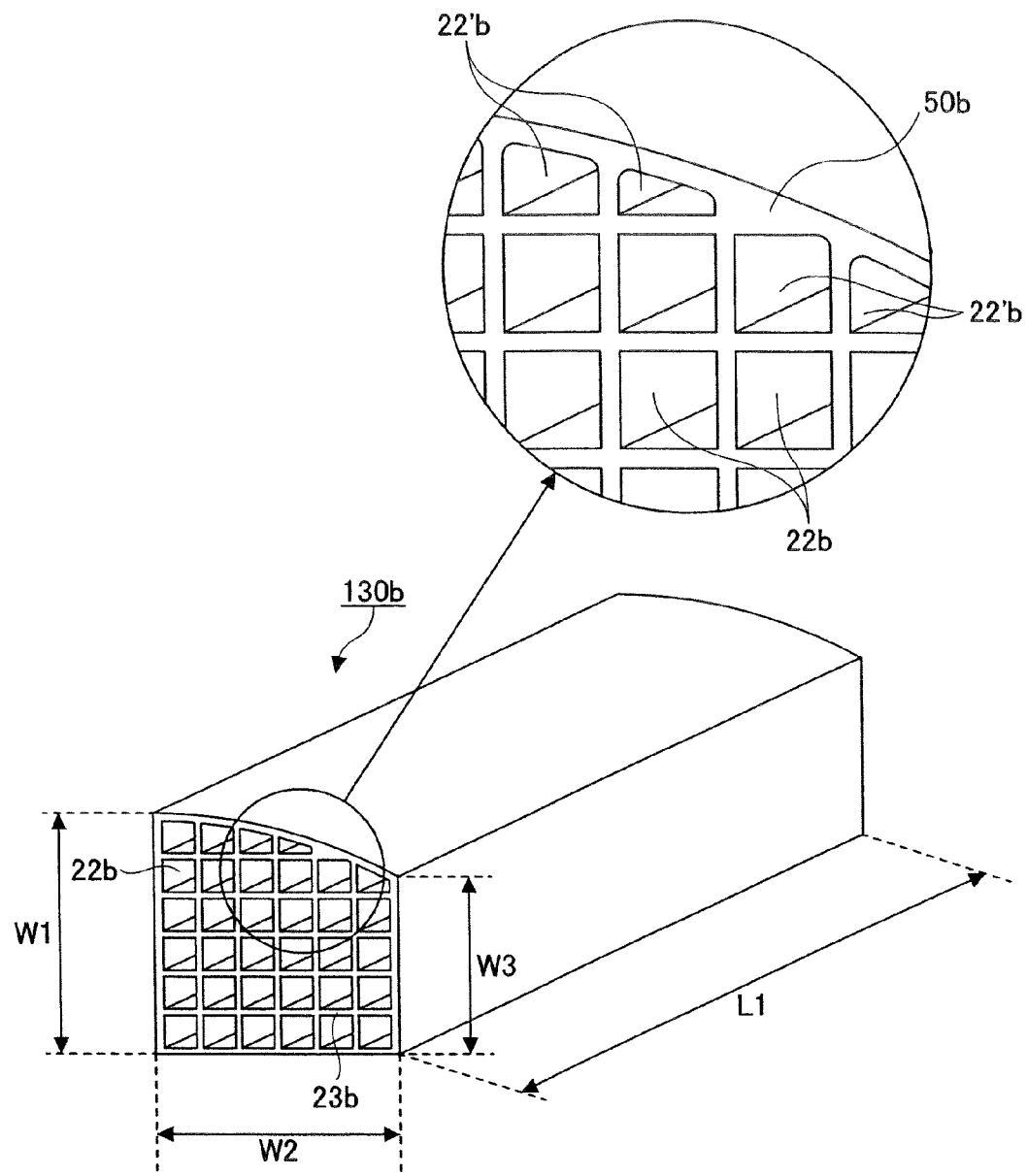
FIG. 7 is a schematic perspective view of a second honeycomb unit forming the catalyst carrier according to the embodiment of the present invention.
Figure 8:
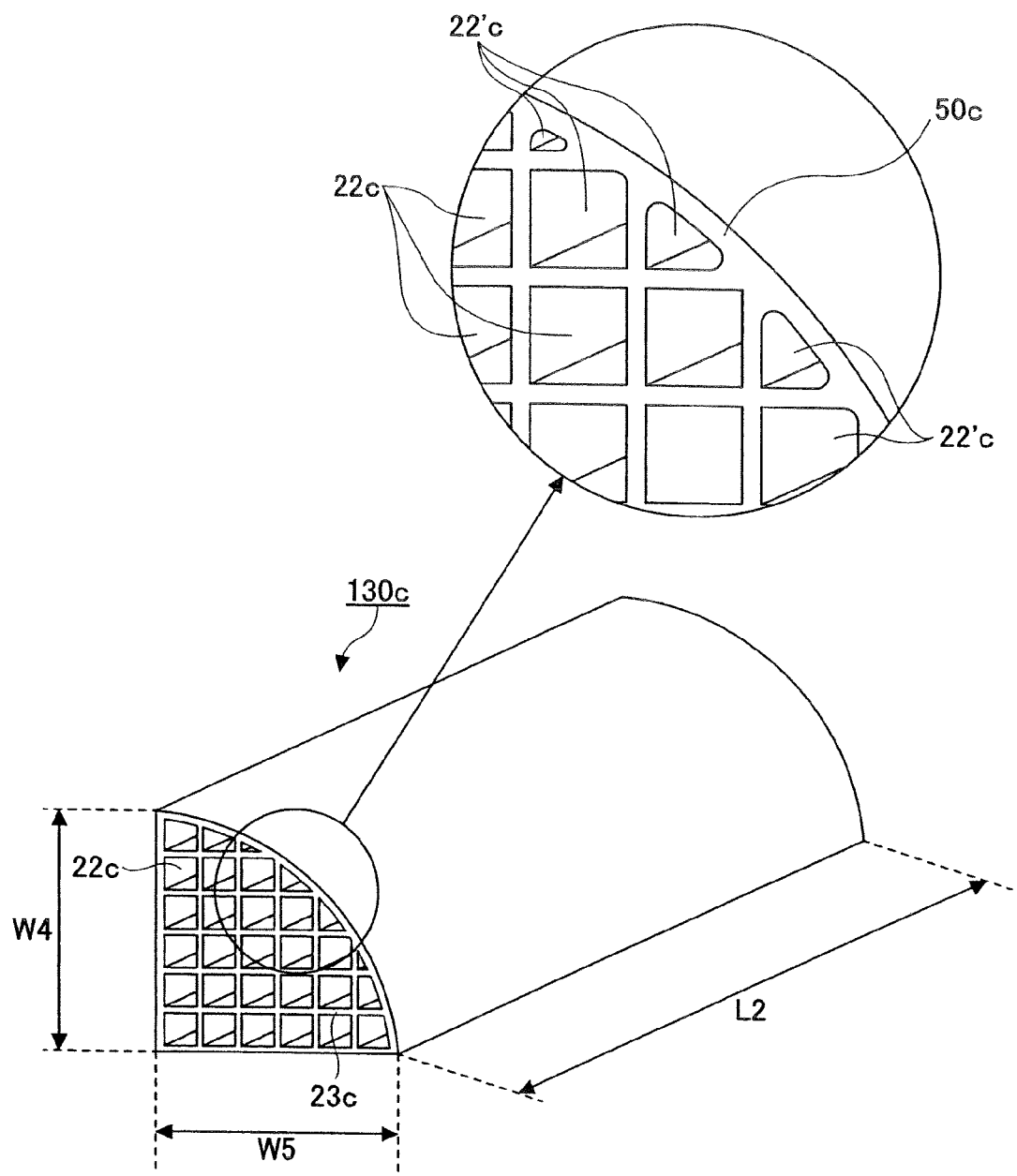
FIG. 8 is a schematic perspective view of a third honeycomb unit forming the catalyst carrier according to the embodiment of the present invention.

FIG. 3 is a schematic diagram showing a catalyst carrier 100 according to an embodiment of the present invention. Further, FIG. 4 is a schematic diagram showing a ceramic block 140 that forms the framework part of the catalyst carrier 100. Further, FIGS. 5, 7, and 8 are schematic diagrams showing a first honeycomb unit 130a, a second honeycomb unit 130b, and a third honeycomb unit 130c, respectively, forming the ceramic block 140. FIG. 6 is a cross-sectional view of the first honeycomb unit 130a of FIG. 5 taken along a plane extending longitudinally from the line A-A.

As shown in FIG. 3, the catalyst carrier 100 includes the ceramic block 140 and a coat layer 120 provided on the outer peripheral surface of the ceramic block 140, excluding its open end faces.

The ceramic block 140 is formed by combining honeycomb units of three kinds of shapes shown in FIGS. 5 through 8. For example, the ceramic block 140 shown in FIG. 4 is formed by combining four first honeycomb units 130a, eight second honeycomb units 130b, and four third honeycomb units 130c into a substantially cylindrical shape. More specifically, in the case of forming the cylindrical ceramic block 140, first, first honeycomb units 130a of the same shape are stacked vertically and horizontally in two rows each, thereby forming a center part. Then, four unit pairs, each formed by providing two second honeycomb units 130b side by side in mirror symmetry, are provided on the corresponding upper, lower, right, and left sides of the center part, thereby forming part of the outer peripheral part of the ceramic block 140. Further, a third honeycomb unit 130c is provided in each of the four gaps formed between the four unit pairs of the second honeycomb units 130b so as to make the outer peripheral part of the ceramic block 140 smooth and continuous. Thereby, the ceramic block 140 is formed.

An adhesive layer 110 is provided among these honeycomb units 130a through 130c so as to unite the honeycomb units 130a through 130c and maintain the shape of the ceramic block 140.

As shown in FIGS. 5 and 6, the first honeycomb unit 130a has a substantially square pillar shape. Multiple cells 22a divided by a cell wall 23a are provided inside the first honeycomb unit 130a so as to extend along a longitudinal direction thereof. Each cell 22a has both end faces open. A catalyst formed of a noble metal such as platinum is carried by the cell wall 23a.

As shown in FIG. 7, the second honeycomb unit 130b has a pillar shape formed by replacing one outer peripheral surface (side surface) of a square pillar with a curved surface. The other side surfaces are flat. In particular, the flat side surface facing away from the curved side surface has a width W2 substantially equal to the width of the side surface of the first honeycomb unit 130a, which side surface is to be provided next to the flat side surface of the second honeycomb unit 130b at the time of assembly. Multiple cells 22b divided by a cell wall 23b are provided inside the second honeycomb unit 130b so as to extend along a longitudinal direction thereof, the same as in the case of the first honeycomb unit 130a. Each cell 22b has both end faces open. A catalyst formed of a noble metal such as platinum is carried by the cell wall 23b.

As shown in FIG. 8, the third honeycomb unit 130c has a curved surface as one of its outer peripheral surfaces. The other side surfaces are flat and cross each other at right angles. Further, the cross section of the honeycomb unit 130c perpendicular to its longitudinal direction has a substantially section shape. The two flat side surfaces have respective widths W4 and W5, which are substantially equal to the width (for example, W3 in FIG. 7) of the side surface of the second honeycomb unit 130b, which side surface is to be provided next to one of the flat side surfaces of the third honeycomb unit 130c at the time of assembly. Multiple cells 22c divided by a cell wall 23c are provided inside the third honeycomb unit 130c so as to extend along its longitudinal direction, the same as in the case of the first honeycomb unit 130a. Each cell 22c has both end faces open. A catalyst formed of a noble metal such as platinum is carried by the cell wall 23c.

In the following, honeycomb units that do not form the outer peripheral surface of a ceramic block when the ceramic block is formed, such as the first honeycomb unit 130a, are particularly referred to as "center-side honeycomb units" as required. Likewise, honeycomb units that form the outer peripheral surface of a ceramic block when the ceramic block is formed, such as the second and third honeycomb units 130b and 130c, are particularly referred to as "outer-peripheral-side honeycomb units" as required. Further, in each honeycomb unit, a cell wall that forms the outer periphery of the honeycomb unit is particularly referred to as "outer peripheral cell wall." In particular, of the "outer peripheral cell walls," those to be positioned on the outermost peripheral side of a ceramic block when the ceramic block is formed are referred to as "outermost peripheral cell walls." Further, in each honeycomb unit, cells that are in contact with a cell wall forming the outer periphery of the honeycomb unit (that is, the "outer peripheral cell wall") are particularly referred to as "outer peripheral cells." In particular, of the "outer peripheral cells," those to be positioned on the outermost peripheral side of a ceramic block when the ceramic block is formed are referred to as "outermost peripheral cells." As is clear from these definitions, the "center-side honeycomb unit" has no "outermost peripheral cell wall" or "outermost peripheral cell."

Referring back to FIGS. 5 through 8, in the first honeycomb unit 130a, the cross section of each cell 22a perpendicular to its longitudinal direction has a substantially square shape, and each cell 22a has four substantially right-angled corner parts. On the other hand, in the second honeycomb unit 130b and the third honeycomb unit 130c, some corner parts have curved surfaces in the "outermost peripheral cells." That is, as shown enlarged in a circled part in FIG. 7, of the corner parts of "outermost peripheral cells" 22'b, those in contact with an "outermost peripheral cell wall" 50b have curved surfaces. Likewise, as shown enlarged in a circled part in FIG. 8, of the corner parts of "outermost peripheral cells" 22'c, those in contact with an "outermost peripheral cell wall" 50c have curved surfaces.

In the present invention, the expression that a corner part of a cell has (or is provided with) a "curved surface" refers to not only the condition where the corner part of the cell is defined as rounded (having a rounded surface) but also the condition where the corner part of the cell is chamfered (has a chamfered surface). Further, it is obvious to a person having ordinary skill in the art that in practice, such "surface-curving" of a corner part of a cell is performed by rounding or chamfering the corner part of a cell wall at a corresponding position.

A description is given below of effects of the catalyst carrier 100 thus configured according to the embodiment of the present invention.

Generally, when a stress is applied from the direction of the outer periphery, the stress is likely to be dispersible so as to make it less likely for breakage to occur in the case of providing the above-described outermost peripheral cells having curved-surface corner parts in the second and third honeycomb units 130b and 130c. That is, it is possible to increase the strength of the catalyst carrier 100 against stress from the direction of its outer periphery.

According to the embodiment of the present invention, such surface-curving of a corner part may not be applied to all the cells of the second and third honeycomb units 130b and 130c (that is, outer-peripheral-side honeycomb units), but may be applied to only those of the corner parts of the "outermost peripheral cells" which are in contact with the "outermost peripheral cell wall." A description is given below of its effect.

In the conventional catalyst carrier, the cell wall is required to have as high a specific surface area as possible in order to increase the contact probability of exhaust gas and the catalyst and thereby to improve the rate of conversion. Accordingly, the catalyst carrier as described in JP2005-349378A has a large specific surface area while its strength tends to be low. Therefore, consideration should be given to the catalyst carrier so that no breakage is caused at the times of its installation and use and an appropriate strength is maintained.

In order to prevent breakage of such a catalyst carrier, it is considered, for example, to define the corner parts of the cell as having arc shapes.

Figure 2:
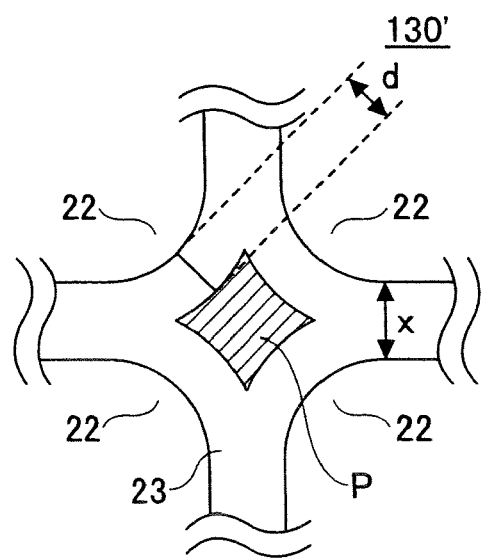
FIG. 2 is an enlarged cross-sectional view of a honeycomb unit in which the corner parts of cells have curved surfaces.

FIGS. 1 and 2 are enlarged views of cross sections of the typical honeycomb units 130 and 130' perpendicular to their longitudinal directions. In the honeycomb unit 130 of FIG. 1, none of the corner parts of the cells 22 is provided with a curved surface. In the honeycomb unit 130' of FIG. 2, all the corner parts of the cells 22 are provided with a curved surface. That is, the cells 22 have substantially right-angled corner parts in FIG. 1 while the corner parts of the cells 22 are defined as having curved surfaces in FIG. 2. In each case, the cell wall 23 carries a catalyst.

In practical use of catalyst carriers formed by these honeycomb units 130 and 130', exhaust gas flowing through the cells 22 penetrates into the porous cell wall 23, and is converted by coming into contact with a catalyst provided in the cell wall 23.

Letting the maximum distance of penetration of exhaust gas flowing through the cells 22 into the cell wall 23 be "d," the exhaust gas flowing through each cell 22 is believed to be able to reach (penetrate into) substantially all the region of the cell wall 23 in the honeycomb unit 130 where the corner parts of the cells 22 are not provided with a curved surface as shown in FIG. 1 if the cell wall 23 has a thickness "x" less than or equal to $(d \cdot \sqrt{2})$. This means that substantially all the catalyst provided in the cell wall 23 can contribute (can be used) to conversion reaction of exhaust gas. The catalyst carrier formed of this honeycomb unit 130 has a high conversion rate.

On the other hand, in the case of the honeycomb unit 130' of FIG. 2, whose cells 22 have corner parts having curved surfaces, the exhaust gas flowing through each cell 22 cannot reach the region "P" of the cell wall 23 indicated by an oblique line part although the cell wall 23 has the same thickness x. That is, it is believed that the exhaust gas flowing through each cell 22 can penetrate into only a partial region of the cell wall 23, so that there is a region P that the exhaust gas cannot reach. As a result, the catalyst provided in this region P (provided inside the cell wall 23) cannot contribute to conversion reaction of exhaust gas. Accordingly, in the catalyst carriers of FIGS. 1 and 2, if the total amount of a catalyst provided in the cell wall 23 of the honeycomb unit is fixed, the catalyst carrier formed of the honeycomb unit 130' of FIG. 2 is believed to be reduced in the rate of conversion of exhaust gas.

Thus, it is believed that providing a corner part of a cell with a curved surface improves the strength of a catalyst carrier but causes the problem of reduction in the rate of conversion of exhaust gas.

According to the embodiment of the present invention, however, it may be only the "outermost peripheral cells," which greatly affect the strength of a catalyst carrier, that have one or more corner parts thereof provided with a curved surface in the second and third honeycomb units 130b and 130c, which correspond to the outer peripheral side of the assembled ceramic block 140. The corner parts of the other cells may not be provided with a curved surface. Therefore, according to the embodiment of the present invention, it is possible to increase the strength by providing corner parts of the "outermost peripheral cells" with a curved surface, and it is also possible to minimize reduction in the conversion rate due to the surface-curving of corner parts of the "outermost exterior cells."

In addition, according to this embodiment, the cells are arranged so that the outermost peripheral wall has uniform thickness. This increases an opening ratio, so that it is likely that exhaust gas conversion performance can be further improved.

According to the present invention, the cells subjected to surface-curving of a corner part are not necessarily limited to the "outermost peripheral cells" of the "outer-peripheral-side honeycomb unit." For example, additionally, the corner parts in contact with the "outer peripheral cell wall" in the "outer peripheral cells" of the "outer-peripheral-side honeycomb unit" may have curved surfaces. Alternatively, in addition to these or instead of these, the corner parts in contact with the "outer peripheral cell wall" in the "outer peripheral cells" of the "center-side honeycomb unit" may have curved surfaces. In these cases, the ratio of the corner parts to be subjected to surface-curving to the corner parts of all the cells of the ceramic block 140 is extremely small, so that reduction in the conversion rate due to surface-curving is almost negligible. According to the embodiment of the present invention, however, of the corner parts of the "outermost peripheral cells" of the "outer-peripheral-side honeycomb unit," at least those in contact with the "outermost peripheral cell wall" should have curved surfaces in order to ensure strength.

Further, the shapes of the above-described first, second, and third honeycomb units 130a, 130b, and 130c are examples, and those having shapes other than those shown in the drawings may also be used. Further, in the above-described case, the ceramic block is formed by combining honeycomb units of three kinds of shapes. Alternatively, the ceramic block may be formed by combining honeycomb units of two or more than three kinds of shapes.

Figure 9:
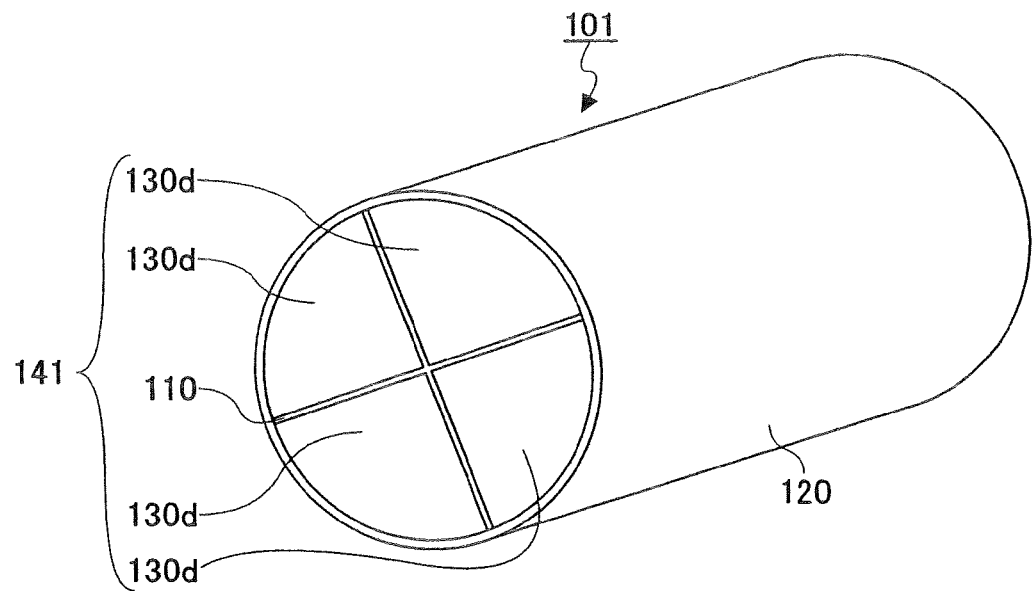
FIG. 9 is a schematic diagram showing another catalyst carrier according to the embodiment of the present invention.

In particular, a description is given above of a catalyst carrier according to the embodiment of the present invention, taking the case of forming a ceramic block by combining "outer-peripheral-side honeycomb units" and "center-side honeycomb units" as an example. However, the ceramic block may be formed only of "outer-peripheral-side honeycomb units." FIG. 9 shows another configuration of the catalyst carrier according to the present invention having such a ceramic block. As is clear from this drawing, a catalyst carrier 101 has a ceramic block 141 that is formed by combining only fourth honeycomb units 130d, that is, "outer-peripheral-side honeycomb units," through the adhesive layer 110.

Here, the "outer peripheral cell wall" and the "outermost peripheral cell wall" of a honeycomb unit are preferably in the range of approximately 0.25 through approximately 0.5 mm in thickness in terms of strength. In the case of the "outermost peripheral cell wall," however, its optimal thickness is determined based on the relationship with the thickness of a coat layer. Further, the thicknesses of the cell walls 23a, 23b, and 23c other than the "outer peripheral cell walls" of the honeycomb units 130a, 130b, and 130c (or interior cell walls) are not limited in particular, but their desirable lower limits are approximately 0.1 mm in terms of strength and their desirable upper limits are approximately 0.4 mm in terms of pressure loss and gas penetration.

Further, in the above-described example of the catalyst carrier (FIG. 3), the catalyst carrier 100 having the coat layer 120 provided on the outer peripheral surface of the ceramic block 140 is shown, while provision of this coat layer 120 is optional. However, provision of the coat layer 120 increases the strength of the outer peripheral surface of the ceramic block 140, so that it is possible to further increase the strength of the catalyst carrier 100.

The thickness of the coat layer 120 is not limited in particular, but is preferably in the range of approximately 0.4 through approximately 3.0 mm. However, its optimal thickness is determined based on the relationship with the thickness of the "outermost peripheral cell wall." Preferably, the coat layer 120 is substantially uniform in order to avoid a local decrease in strength.

Such a catalyst carrier according to the embodiment of the present invention may be used in, for example, an exhaust gas treatment apparatus for vehicles.

Figure 10:
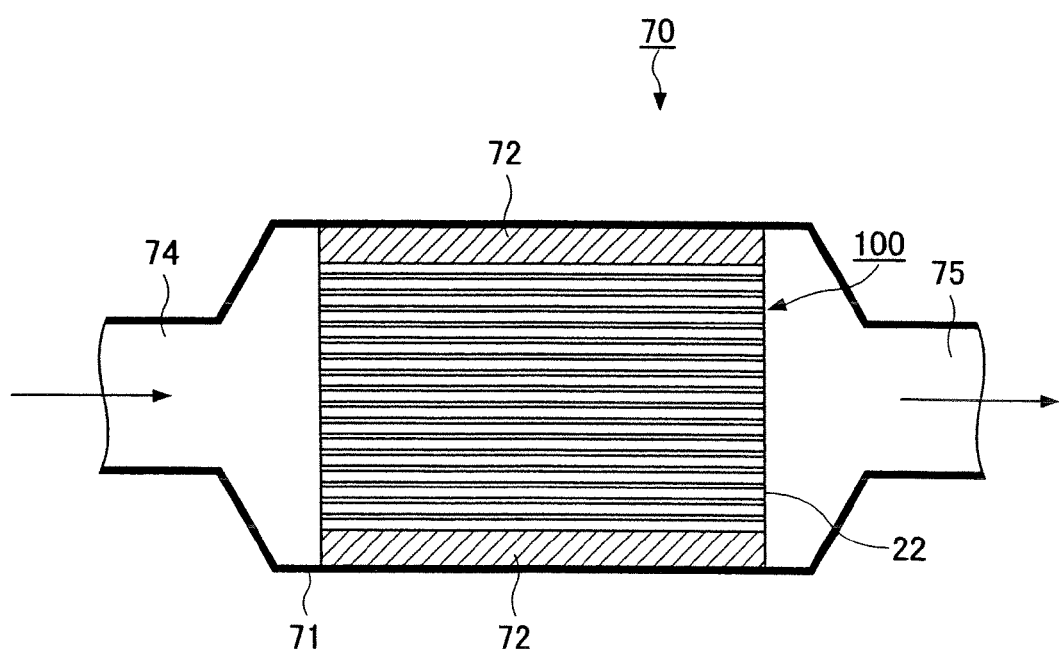
FIG. 10 is a schematic cross-sectional view of an exhaust gas treatment apparatus in which the catalyst carrier of the embodiment of the present invention is provided.

FIG. 10 is a schematic diagram showing an exhaust gas treatment apparatus 70 having the catalyst carrier 100 according to the embodiment of the present invention attached thereto. As shown in FIG. 10, the exhaust gas treatment apparatus 70 includes the catalyst carrier 100, a metal casing 71 that houses the catalyst carrier 100, and a holding seal material 72 that is provided between the catalyst carrier 100 and the casing 71 and holds the catalyst carrier 100 at an appropriate position. Further, an introduction pipe 74 for introducing exhaust gas discharged from an internal combustion engine is connected to one end (introduction part) of the exhaust gas treatment apparatus 70. An exhaust pipe 75 for discharging the exhaust gas is connected to the other end (discharge part) of the exhaust gas treatment apparatus 70. In the drawing, the arrows indicate the flow of the exhaust gas.

The exhaust gas discharged from the internal combustion engine is introduced into the casing 71 through the introduction pipe 74, and flows into the catalyst carrier 100 by flowing into each cell 22 from an end face of the catalyst carrier 100, which end face faces the introduction pipe 74. The exhaust gas that has flowed into the catalyst carrier 100 comes into contact with a catalyst while passing through the cells 22, and harmful components such as CO, HC, and NOx are converted by conversion reaction that occurs at this point. Thereafter, the exhaust gas is discharged from the exhaust gas treatment apparatus 70 through the other end face of the catalyst carrier 100, and is finally discharged outside through the exhaust pipe 75.

According to this exhaust gas treatment apparatus 70, the catalyst carrier 100 is formed of the ceramic block 140 that has multiple cells whose corner parts have no curved surfaces. Accordingly, the catalyst carrier 100 presents a good conversion rate. Further, in this catalyst carrier 100, of the corner parts of the cells positioned on the outer peripheral side of the ceramic block 140 (that is, "outermost peripheral cells"), which require particularly high strength, those in contact with the "outermost peripheral cell wall" have curved surfaces. Accordingly, the catalyst carrier 100 presents good strength against a compressive stress of the outer peripheral direction applied from the casing 71 or holding seal material 72 side. Therefore, according to the embodiment of the present invention, a catalyst carrier having high isostatic strength and a high conversion rate is provided.

The composition of the honeycomb units 130*a*, 130*b*, and 130*c* forming the catalyst carrier 100 according to the embodiment of the present invention is not limited in particular. It is desirable, however, that the honeycomb units 130*a*, 130*b*, and 130*c* contain inorganic particles and inorganic fibers and/or whiskers. This is because the inorganic particles increase the specific surface area and the inorganic fibers and/or whiskers increases the strength of the honeycomb unit.

The inorganic particles are desirably particles of alumina, silica, zirconia, titania, ceria, mullite, zeolite, or the like. These particles may be used alone or two or more of them may be used in combination. Of these, alumina particles and ceria particles are particularly desirable.

The inorganic fibers or whiskers are desirably inorganic fibers or whiskers of alumina, silica, silicon carbide, silica alumina, glass, potassium titanate, aluminum borate, or the like. These may be used alone or two or more of them may be used in combination. Of the above-described inorganic fibers and/or whiskers, aluminum borate whiskers are more desirable.

In this specification, inorganic fibers or whiskers refer to those having an average aspect ratio (length/diameter) more than approximately five. Further, a desired average aspect ratio of the inorganic fibers or whiskers is approximately 10 through approximately 1000.

With respect to the amount of the inorganic particles contained in the honeycomb unit, a desirable lower limit is approximately 30 wt %, a more desirable lower limit is approximately 40 wt %, and a further desirable lower limit is approximately 50 wt %. On the other hand, a desirable upper limit is approximately 97 wt %, a more desirable upper limit is approximately 90 wt %, a further desirable upper limit is approximately 80 wt %, and a particularly desirable upper limit is approximately 75 wt %.

If the inorganic particles content is more than or equal to approximately 30 wt %, the inorganic particles contributing to an increase in specific surface area are relatively increased in amount. Accordingly, the specific surface area is prevented from becoming excessively small as a honeycomb structure, so that a catalyst component is likely to be highly dispersed at the time of carrying the catalyst component. On the other hand, if the inorganic particles content is less than or equal to 97 wt %, the inorganic fibers and/or whiskers contributing to an increase in strength are relatively increased in amount. Accordingly, the strength of the honeycomb structure is less likely to be reduced.

With respect to the total amount of the inorganic fibers and/or whiskers contained in the honeycomb unit, a desirable lower limit is approximately 3 wt %, a more desirable lower limit is approximately 5 wt %, and a further desirable lower limit is approximately 8 wt %. On the other hand, a desirable upper limit is approximately 70 wt %, a more desirable upper limit is approximately 50 wt %, a further desirable upper limit is approximately 40 wt %, and a particularly desirable upper limit is approximately 30 wt %.

If the inorganic fibers and/or whiskers content is more than or equal to approximately 3 wt %, the strength of the honeycomb structure is less likely to be reduced. If the inorganic fibers and/or whiskers content is less than or equal to approximately 50 wt %, the inorganic particles contributing to an increase in specific surface area are relatively increased in amount. As a result, the specific surface area is prevented from becoming excessively small as a honeycomb structure, so that a catalyst component is likely to be highly dispersed at the time of carrying the catalyst component.

Further, the honeycomb unit is desirably manufactured using a material composition that is a mixture containing the inorganic particles, the inorganic fibers and/or whiskers, and an inorganic binder. By thus using a material composition containing an inorganic binder, a honeycomb unit having suitable strength can be obtained even with lowered temperatures for firing a raw molded body.

Inorganic sol, a clay-based binder, etc., may be used as the inorganic binder. Specific examples of the inorganic sol include alumina sol, silica sol, titania sol, water glass, and the like. Examples of the clay-based binder include clay, kaolin, montmorillonite, clays of a double-chain structure type, such as sepiolite and attapulgite, and the like. These may be used alone or two or more of them may be used in combination.

Of these, at least one selected from the group consisting of alumina sol, silica sol, titania sol, water glass, sepiolite, and attapulgite is desirable.

With respect to the amount of the inorganic binder contained in the material composition, a desirable lower limit is approximately 5 wt %, a more desirable lower limit is approximately 10 wt %, and a further desirable lower limit is approximately 15 wt % while a desirable upper limit is approximately 50 wt %, a more desirable upper limit is approximately 40 wt %, and a further desirable upper limit is approximately 35 wt % as a solid content per the total amount of the solid content of the inorganic particles, inorganic fibers and/or whiskers, and inorganic binder contained in the material composition.

If the inorganic binder is more than or equal to approximately 5 wt % in amount, the strength of a manufactured honeycomb structure is less likely to be reduced. On the other hand, if the inorganic binder content is less than or equal to approximately 50 wt % in amount, the moldability of the material composition tends to be less likely to be degraded.

According to the catalyst carrier 100 according to the embodiment of the present invention, the adhesive layer 110 and the coat layer 120 may be either of the same material or of different materials. Further, these layers 110 and 120 may be either dense or porous. The material forming the adhesive layer 110 and the coat layer 120 is not limited in particular. For example, a material formed of an inorganic binder, an organic binder, and inorganic fibers and/or inorganic particles may be used.

As the inorganic binder, for example, silica sol, alumina, etc., may be used. These may be used alone or two or more of them may be used in combination. Of the above-mentioned inorganic binders, silica sol is desirable.

As the organic binder, for example, polyvinyl alcohol, methylcellulose, ethylcellulose, carboxymethylcellulose, etc., may be used. These may be used alone or two or more of them may be used in combination. Of the above-mentioned inorganic binders, carboxymethylcellulose is desirable.

As the inorganic fibers, ceramic fibers of, for example, silica-alumina, mullite, alumina, silica, etc., may be used. These may be used alone or two or more of them may be used in combination. Of the above-mentioned inorganic fibers, silica-alumina fibers are desirable.

As the inorganic particles, those described above may be used. These may be used alone or two or more of them may be used in combination. In particular, the adhesive layer 110 and the coat layer 120 preferably include the same material as the honeycomb unit.

Usually, the adhesive layer 110 and the coat layer 120 are formed by preparing paste containing the above-described components as a material, and drying it after setting it in a predetermined place. A pore-forming agent such as balloons, which are minute hollow balls whose component is oxide-based ceramic, spherical acryl particles, graphite, or the like may be added to the paste serving as a material as required.

The catalyst carrier 100 of the present invention may have any shape. For example, the catalyst carrier shape may be a cylindroid shape and the like instead of a cylindrical shape shown in FIG. 3.

[Method of Manufacturing Catalyst Carrier]

Next, a description is given of a method of manufacturing a catalyst carrier according to the embodiment of the present invention.

Figure 11:
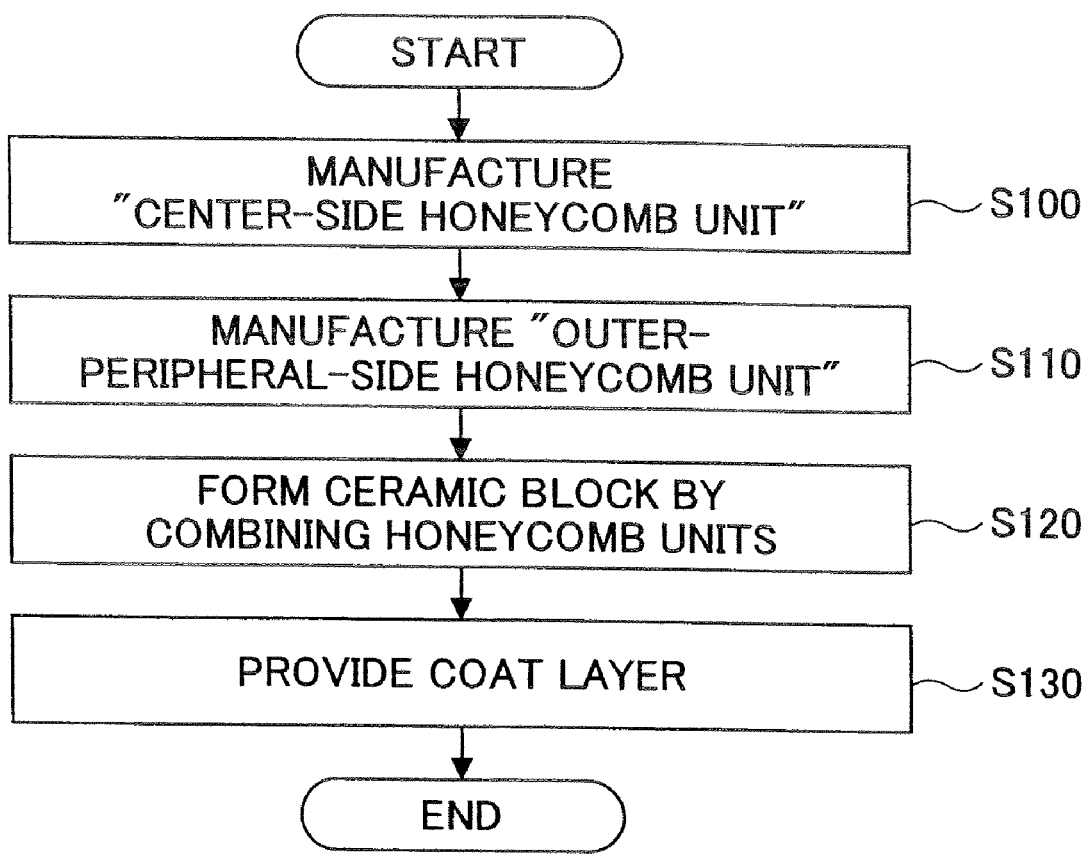
FIG. 11 is a flowchart showing a manufacturing flow of the catalyst carrier of the embodiment of the present invention.

FIG. 11 shows a flow of manufacturing a catalyst carrier according to the embodiment of the present invention.

In step S100, "center-side honeycomb units" provided with a catalyst (for example, honeycomb units of a substantially square pillar shape as shown in FIG. 5) are made by the following process.

First, extrusion molding is performed using raw material paste including the above-described ceramic materials as principal components.

In addition to these, an organic binder, a dispersion medium, and a molding aid may be added appropriately to the raw material paste in accordance with moldability. The organic binder is not limited in particular, and its examples include one or more organic binders selected from methylcellulose, carboxymethylcellulose, hydroxyethylcellulose, polyethylene glycol, etc. The blending of the organic binder is preferably approximately 1 part through approximately 10 parts by weight per 100 parts by weight of the total of the inorganic particles, inorganic fibers and/or whiskers, and inorganic binder. The dispersion medium is not limited in particular, and its examples include water, an organic solvent (such as benzene), alcohol (such as methanol), and the like. The molding aid is not limited in particular, and its examples include ethylene glycol, dextrin, a fatty acid, fatty acid soap, and polyalcohol.

The raw material paste is not limited in particular, and is preferably subjected to mixing and kneading. For example, the raw material paste may be mixed using a mixer or attritor, and may be well kneaded with a kneader. The method of molding the raw material paste is not limited in particular. Preferably, the raw material paste is formed into a shape having cells by, for example, extrusion molding or the like.

Next, it is preferable to dry the obtained molded body. The drier used for drying is not limited in particular, and its examples include a microwave drier, hot air drier, dielectric drier, reduced-pressure drier, vacuum drier, freeze drier, and the like. Further, it is preferable to degrease the obtained molded body. The conditions for degreasing, which are not limited in particular and are selected suitably in accordance with the kind and amount of organic matter included in the molded body, are preferably approximately 400° C. and approximately 2 hours. Further, it is preferable to subject the obtained molded body to firing. The condition for firing is not limited in particular, and is preferably approximately 600° C. through approximately 1200° C., and more preferably approximately 600° C. to approximately 1000° C. This is because sintering of the inorganic particles progresses at firing temperatures more than or equal to approximately 600° C., so that the strength is less likely to be reduced as a honeycomb structure, and because sintering of the inorganic particles does not progress excessively at firing temperatures less than or equal to approximately 1200° C., so that the specific surface area per unit volume is prevented from being excessively reduced. By performing the above-described processing, "center-side honeycomb units" are manufactured.

Next, in step S110, "outer-peripheral-side honeycomb units" (for example, honeycomb units shaped as shown in FIGS. 7 and 8) are manufactured through the same process. The "outer-peripheral-side honeycomb unit" is different from the above-described "center-side honeycomb unit" not only in shape but also in that of the corner parts of the "outermost peripheral cell," at least those in contact with the "outermost peripheral cell wall" have curved surfaces.

Next, in step S120, the "center-side honeycomb units" and the "outer-peripheral-side honeycomb units" are combined by interposing an adhesive layer, so that a ceramic block is formed.

In this process, first, adhesive layer paste to serve as the adhesive layer later is applied to a side surface of one of the "center-side honeycomb units" so as to be uniform in thickness. Thereafter, another honeycomb unit is successively stacked by interposing this adhesive layer paste. A ceramic block of a desired shape is manufactured by repeating this process. The above-described material paste may be used as the adhesive layer paste. Thereafter, by heating the ceramic block, the adhesive layer paste is dried and solidified so that the adhesive layer is formed, and the porous honeycomb units are fixed to each other.

Next, in step S130, a coat layer is provided on the outer peripheral surface of the ceramic block. This step S130 is optional, and is performed when necessary.

In the case of providing the coat layer, first, coat layer paste is provided on the outer peripheral part of the ceramic block, excluding its open faces. The method of forming the coat layer is not limited in particular, and may be, for example, as follows. A support member with rotating means is used to support the ceramic block in the directions of its rotational axis and rotate the ceramic block, so as to cause the coat layer paste to adhere to the outer peripheral part of the rotating ceramic block. Then, the paste is spread using a plate member or the like so as to form a paste layer. Thereafter, the paste layer is dried at, for example, temperatures more than or equal to 120° C. to evaporate moisture, thereby forming the coat layer on the outer peripheral part of the ceramic block.

The material forming the coat layer is not limited in particular, but preferably includes a heat-resistant material such as inorganic fibers or an inorganic binder. The coat layer may be formed of the same material as the above-described adhesive layer. In this case, the above-described adhesive layer paste is used for the coat layer paste. Thus, a catalyst carrier is manufactured.

Next, the cell wall of the catalyst carrier manufactured as described above is provided with a catalyst. The catalyst material is not limited in particular, and its examples include noble metals such as platinum, palladium, and rhodium. Alternatively, a compound containing an alkali metal, an alkaline earth metal, a rare-earth element, a transition metal, or the like may also be carried. The platinum catalyst is provided by, for example, impregnating a honeycomb unit having a catalyst carrier layer provided thereto with a diamine dinitro platinum nitric acid solution ($[Pt(NH_3)_2(NO_2)_2]$ $HNO_3$) or the like and heating it.

The cell wall may be provided with a catalyst through this process. A unit may be assembled after carrying a catalyst on a honeycomb unit or a honeycomb unit may be manufactured with a material containing a catalyst.

This method of manufacturing a catalyst carrier according to the embodiment of the present invention does not include the process of cutting a ceramic block into a desired shape after forming the ceramic block by uniting multiple honeycomb units of the same shape. Accordingly, no portions of honeycomb units are cut and discarded, so that it is possible to manufacture a catalyst carrier at low cost and to simplify a manufacturing process. Further, honeycomb units of these shapes are relatively small molded bodies. Accordingly, thermal expansion caused at the time of firing is small, so that a reduced yield due to occurrence of a crack during manufacture is hardly the case, for example.

A detailed description is given below of effects of the present invention based on examples.

EXAMPLE 1

[Manufacture of Catalyst Carrier]

First, 1575 parts by weight of γ-alumina particles (2 μm in average particle size), 675 parts by weight of zeolite, 680 parts by weight of aluminum borate whiskers, 2600 parts by weight of silica sol (of a solid concentration of 30 wt %), 320 parts by weight of methylcellulose, 225 parts by weight of a plasticizer (glycerin), and 290 parts by weight of a lubricant (UNILUB) were mixed and kneaded so that a mixture composition was obtained. Next, this mixture composition was subjected to extrusion molding with an extruder, so that molded bodies of three kinds of pillar honeycomb units shown in FIGS. 5, 7, and 8 (hereinafter referred to as first, second, and third honeycomb units, respectively) were obtained.

These molded bodies were sufficiently dried using a microwave drier and a hot air drier, and were degreased, being retained at 400° C. for 2 hours. Thereafter, the molded bodies were subjected to firing, being retained at 800° C. for 2 hours, so that honeycomb units of three kinds of shapes were obtained. The first honeycomb units had a shape of vertically 37.0 mm, horizontally 37.0 mm, and 150.0 mm in length. With respect to the second honeycomb units, the dimensions W1, W2, W3, and L1 shown in FIG. 7 were 33.0 mm, 37.0 mm, 20.6 mm, and 150.0 mm, respectively. With respect to the third honeycomb units, the dimensions W4, W5, and L2 shown in FIG. 8 were 20.6 mm, 20.6 mm, and 150.0 mm, respectively. The thickness of the "outer peripheral cell wall" of each honeycomb unit was 0.25 mm, and the thickness of the cell wall of the other part was 0.20 mm. Of the corner parts of the "outermost peripheral cells" of the second and third honeycomb units, those in contact with the "outermost peripheral cell wall" were provided with curved surfaces by chamfering (0.3 mm). On the other hand, no corner parts of any cell had curved surfaces in the first honeycomb units.

Next, 29 wt % of γ-alumina particles (2 μm in average particle size), 7 wt % of silica-alumina fibers (10 μm in average fiber diameter and 100 μm in average fiber length), 34 wt % of silica sol (of a solid concentration of 30 wt %), 5 wt % of carboxymethylcellulose, and 25 wt % of water were mixed to prepare an adhesive layer paste. This adhesive layer paste was applied on side surfaces of each honeycomb unit and the honeycomb units were joined to each other, so that a ceramic block shaped as shown in FIG. 4 was manufactured. The adhesive layer paste was applied evenly on the honeycomb units so that a finished adhesive layer is 1 mm in thickness.

Next, in this state, the above-described adhesive layer paste was applied on the outer peripheral surface of the honeycomb structure, excluding its open faces, in order to form a coat layer. The coat layer paste was provided on the outer peripheral surface of the ceramic block so as to be substantially uniform in thickness. Next, this was retained at 700° C. for 2 hours after being dried at 120° C., thereby degreasing the adhesive layer and the coat layer. The coat layer was 0.4 mm in thickness.

By this process, a catalyst carrier 100 according to Example 1 was obtained.

Next, the catalyst carrier was impregnated with a platinum nitrate solution so as to carry a catalyst so that the weight of platinum per unit volume is 2.5 g/L, and was thereafter retained at 600° C. for 1 hour.

EXAMPLE 2

A catalyst carrier was manufactured by the same method as in the case of Example 1. In Example 2, however, the above-described three kinds of honeycomb units had an "outer peripheral cell wall" of 0.27 mm in thickness. The coat layer was 0.4 mm in thickness.

EXAMPLE 3

A catalyst carrier was manufactured by the same method as in the case of Example 1. In Example 3, however, the above-described three kinds of honeycomb units had an "outer peripheral cell wall" of 0.4 mm in thickness. The coat layer was 0.4 mm in thickness.

EXAMPLE 4

A catalyst carrier was manufactured by the same method as in the case of Example 1. In Example 4, however, the above-described three kinds of honeycomb units had an "outer peripheral cell wall" of 0.5 mm in thickness. The coat layer was 0.4 mm in thickness.

EXAMPLE 5

A catalyst carrier was manufactured by the same method as in the case of Example 1. In Example 5, however, the above-described three kinds of honeycomb units had an "outer peripheral cell wall" of 0.4 mm in thickness. The coat layer was 2.0 mm in thickness.

EXAMPLE 6

A catalyst carrier was manufactured by the same method as in the case of Example 1. In Example 6, however, the above-described three kinds of honeycomb units had an "outer peripheral cell wall" of 0.4 mm in thickness. The coat layer was 3.0 mm in thickness.

EXAMPLE 7

A catalyst carrier was manufactured by the same method as in the case of Example 1. In Example 7, however, the above-described three kinds of honeycomb units had an "outer peripheral cell wall" of 0.4 mm in thickness. The coat layer was 5.0 mm in thickness.

EXAMPLE 8

A catalyst carrier was manufactured by the same method as in the case of Example 1. However, Example 8 is different in that of the corner parts of the "outer peripheral cells" of the second and third honeycomb units, that is, "outer-peripheral-side honeycomb units," those in contact with the "outer peripheral cell wall" are provided with a curved surface by chamfering (0.3 mm). The above-described three kinds of honeycomb units had an "outer peripheral cell wall" of 0.4 mm in thickness. The coat layer was 0.4 mm in thickness.

EXAMPLE 9

A catalyst carrier was manufactured by the same method as in the case of Example 1. However, Example 9 is different in that of the corner parts of the "outer peripheral cells" of all of the first, second, and third honeycomb units, those in contact with the "outer peripheral cell wall" are provided with a curved surface by chamfering (0.3 mm). The above-described three kinds of honeycomb units had an "outer peripheral cell wall" of 0.4 mm in thickness. The coat layer was 0.4 mm in thickness.

COMPARATIVE EXAMPLE 1

Sixteen first honeycomb units carrying a catalyst were manufactured by the same process as in Example 1 described above. The cell wall was 0.2 mm in thickness in both the outer peripheral part and the internal part. None of the cells of these honeycomb units has a curved surface. Next, these honeycomb units of the same shape were joined vertically and horizontally in four rows each through the same adhesive layer as in Example 1 so as to form a ceramic block. Next, this ceramic block was cut into a substantially cylindrical shape (approximately 143 mm in diameter) using a diamond cutter. Thereafter, the same coat layer as in Example 1 was provided on the cut surface of the ceramic block so as to form a catalyst carrier. The coat layer was 0.4 mm in thickness.

COMPARATIVE EXAMPLE 2

A catalyst carrier was manufactured by the same method as in the case of Example 1. However, Comparative Example 2 is different in that all the corner parts of all of the cells have curved surfaces in the first, second, and third honeycomb units. The above-described three kinds of honeycomb units had an "outer peripheral cell wall" of 0.4 mm in thickness. The coat layer was 0.4 mm in thickness.

Table 1 collectively shows a method of manufacturing a ceramic block, a honeycomb unit having a curved-surface corner part and its cell position, the thickness of a cell wall, and the thickness of a coat layer with respect to the catalyst carriers according to the above-described examples and comparative examples.

TABLE 1

|  | CERAMIC BLOCK MANUFAC- TURING METHOD | HONEYCOMB UNIT HAVING CURVED-SURFACE CORNER PART & ITS CELL POSITION |
|---|---|---|
| EXAMPLE 1 | A | OUTER-PERIPHERAL-SIDE HONEYCOMB UNIT OUTERMOST PERIPHERAL CELL (ONLY CORNER PART ON OUTERMOST PERIPHERAL CELL WALL CONTACTING SIDE) |
| EXAMPLE 2 | A | OUTER-PERIPHERAL-SIDE HONEYCOMB UNIT OUTERMOST PERIPHERAL CELL (ONLY CORNER PART ON OUTERMOST PERIPHERAL CELL WALL CONTACTING SIDE) |
| EXAMPLE 3 | A | OUTER-PERIPHERAL-SIDE HONEYCOMB UNIT OUTERMOST PERIPHERAL CELL (ONLY CORNER PART ON OUTERMOST PERIPHERAL CELL WALL CONTACTING SIDE) |
| EXAMPLE 4 | A | OUTER-PERIPHERAL-SIDE HONEYCOMB UNIT OUTERMOST PERIPHERAL CELL (ONLY CORNER PART ON OUTERMOST PERIPHERAL CELL WALL CONTACTING SIDE) |

TABLE 1-continued

| | | |
|---|---|---|
| EXAMPLE 5 | A | OUTER-PERIPHERAL-SIDE HONEYCOMB UNIT<br>OUTERMOST PERIPHERAL CELL<br>(ONLY CORNER PART ON OUTERMOST PERIPHERAL CELL WALL CONTACTING SIDE) |
| EXAMPLE 6 | A | OUTER-PERIPHERAL-SIDE HONEYCOMB UNIT<br>OUTERMOST PERIPHERAL CELL<br>(ONLY CORNER PART ON OUTERMOST PERIPHERAL CELL WALL CONTACTING SIDE) |
| EXAMPLE 7 | A | OUTER-PERIPHERAL-SIDE HONEYCOMB UNIT<br>OUTERMOST PERIPHERAL CELL<br>(ONLY CORNER PART ON OUTERMOST PERIPHERAL CELL WALL CONTACTING SIDE) |
| EXAMPLE 8 | A | OUTER-PERIPHERAL-SIDE HONEYCOMB UNIT<br>OUTER PERIPHERAL CELL<br>(ONLY CORNER PART ON OUTER PERIPHERAL CELL WALL CONTACTING SIDE) |
| EXAMPLE 9 | A | OUTER-PERIPHERAL-SIDE HONEYCOMB UNIT & CENTER-SIDE HONEYCOMB UNIT<br>OUTER PERIPHERAL CELL<br>(ONLY CORNER PART ON OUTER PERIPHERAL CELL WALL CONTACTING SIDE) |
| COMPARATIVE EXAMPLE 1 | B | NONE |
| COMPARATIVE EXAMPLE 2 | A | OUTER-PERIPHERAL-SIDE HONEYCOMB UNIT & CENTER-SIDE HONEYCOMB UNIT<br>ALL CELLS |

| | CELL WALL THICKNESS (mm)<br>TOP: OUTER PERIPHERAL CELL WALL<br>BOTTOM: OTHER CELL WALL | COAT LAYER THICKNESS (mm) | CO CONVERSION RATE (%) | ISOSTATIC STRENGTH (Mpa) |
|---|---|---|---|---|
| EXAMPLE 1 | 0.25<br>0.20 | 0.4 | 75 | 1.5 |
| EXAMPLE 2 | 0.27<br>0.20 | 0.4 | 74 | 1.6 |
| EXAMPLE 3 | 0.40<br>0.20 | 0.4 | 72 | 1.7 |
| EXAMPLE 4 | 0.50<br>0.20 | 0.4 | 72 | 1.8 |
| EXAMPLE 5 | 0.40<br>0.20 | 2.0 | 65 | 2.1 |
| EXAMPLE 6 | 0.40<br>0.20 | 3.0 | 62 | 2.2 |
| EXAMPLE 7 | 0.40<br>0.20 | 5.0 | 58 | 2.4 |
| EXAMPLE 8 | 0.40<br>0.20 | 0.4 | 70 | 1.7 |
| EXAMPLE 9 | 0.40<br>0.20 | 0.4 | 65 | 1.8 |
| COMPARATIVE EXAMPLE 1 | 0.20<br>0.20 | 0.4 | 75 | 1.2 |
| COMPARATIVE EXAMPLE 2 | 0.40<br>0.20 | 0.4 | 32 | 1.8 |

A: JOINING HONEYCOMB UNITS OF VARIOUS SHAPES (WITHOUT CUTTING)
B: JOINING HONEYCOMB UNITS OF SAME SHAPE AND CUTTING

[CO Conversion Rate Measurement]

The CO conversion rate was measured using the catalyst carriers according to Examples 1 through 9 and Comparative Examples 1 and 2 manufactured as above.

The CO conversion rate was measured as follows. The catalyst carrier was provided in a casing. A test gas was caused to flow into the catalyst carrier from one end face side thereof and to be discharged from the other end face side thereof at 150° C. The CO concentration in the discharged test gas was measured with a gas analyzer. From the obtained result, the CO conversion rate was determined as:

CO conversion rate (%)=(CO concentration in the test gas before passing through the catalyst carrier/CO concentration in the test gas after passing through the catalyst carrier)×100.

The composition of the gas used as a test gas is as follows: CO concentration of 500 ppm, HC concentration of 150 ppm, NO concentration of 150 ppm, $CO_2$ concentration of 5 vol %, $O_2$ concentration of 13 vol %, $SO_2$ concentration of 10 ppm, and $H_2O$ concentration of 5 vol %.

The results are collectively shown in Table 1. This table shows that the CO conversion rate is remarkably improved in the catalyst carriers according to Examples 1 through 9 compared with the catalyst carrier according to Comparative Example 2, where all the corner parts of all the cells have curved surfaces.

[Isostatic Strength Measurement]

The isostatic strength was measured using the catalyst carriers according to Examples 1 through 9 and Comparative Examples 1 and 2 manufactured as described above. Here, the isostatic strength is a compressing breaking load at the time of occurrence of breakage in the case of imposing an isotropic hydrostatic pressure load on a catalyst carrier, and is provided in the JASO standard M505-87, which is an automobile standard issued by the Society of Automotive Engineers of Japan, Inc. The entire contents of the JASO standard M505-87 are hereby incorporated by reference.

The isostatic strength was measured as follows. A metal plate (aluminum plate of 15 mm in thickness) was provided on each open face of the catalyst carrier. Next, this catalyst carrier with the metal plates was wrapped in a urethane rubber sheet (2 mm in thickness) to be hermetically sealed. Next, this hermetically sealed body was completely immersed in a container containing water. In this state, the water pressure was increased, and a pressure to cause breakage in the catalyst carrier was measured.

Figure 12:
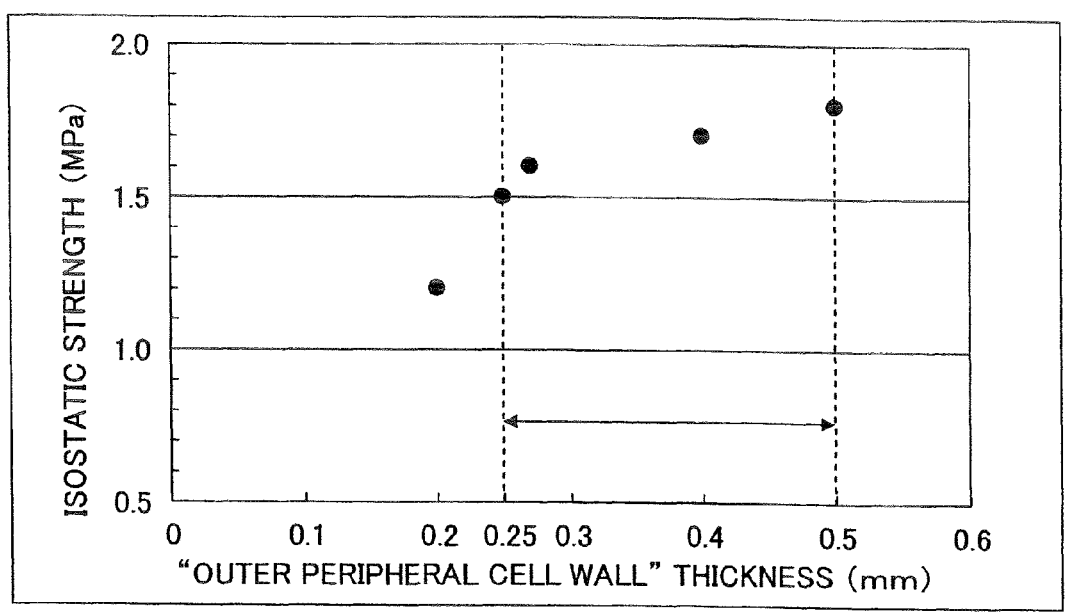
FIG. 12 is a graph showing the relationship between the thickness of the "outer peripheral cell wall" and the isostatic strength of a catalyst carrier with a unified coat layer of 0.4 mm.

Table 1 collectively shows the results obtained in the catalyst carriers. Further, FIG. 12 shows a graph showing the relationship between the thickness of the "outer peripheral cell wall" and the isostatic strength of the catalyst carrier with a unified coat layer of 0.4 mm.

These results show that the isostatic strength is improved in the catalyst carriers according to Examples 1 through 9 compared with the catalyst carrier having no cells with curved-surface corner parts according to Comparative Example 1. In particular, the graph of FIG. 12 shows that extremely good isostatic strength can be obtained in the catalyst carriers whose "outer peripheral cell walls" are more than or equal to 0.25 mm in thickness.

The comparison of Examples 3 and 8 shows that there is little difference in isostatic strength between the case of performing surface-curving on the corner parts of the "outermost peripheral cells" (only the corner parts in contact with the "outermost peripheral cell wall") and the case of performing surface-curving on the corner parts of the "outer peripheral cells" (only the corner parts in contact with the "outer peripheral cell walls") in the outer-peripheral-side honeycomb units. Likewise, the comparison of Examples 8 and 9 shows that there is little difference in isostatic strength between the case of performing surface-curving on the corner parts of the "outer peripheral cells" (only the corner parts in contact with the "outer peripheral cell wall") in the outer-peripheral-side honeycomb units and the case of performing surface-curving on the corner parts of the "outer peripheral cells" (only the corner parts in contact with the "outer peripheral cell wall") in both the outer-peripheral-side honeycomb units and the center-side honeycomb units. Accordingly, when the CO conversion rate is taken into consideration, it is more preferable that surface-curving of a corner part be applied to only the "outermost peripheral cells" of the "outer-peripheral-side honeycomb unit."

However, it is likely that breakage at the time of manufacture (particularly at the time of assembly) can be prevented if the corner parts of cells in contact with the outer peripheral cell wall have curved surfaces.

The present invention is not limited to the specifically disclosed embodiments, and variations and modifications may be made without departing from the scope of the present invention. It should be noted that the exemplary embodiments depicted and described herein set forth the preferred embodiments of the present invention, and are not meant to limit the scope of the claims hereto in any way. Numerous modifications and variations of the present invention are possible in light of the above teachings. It is therefore to be understood that, within the scope of the appended claims, the invention may be practiced otherwise than as specifically described herein.

What is claimed is:

1. A catalyst carrier comprising:
a ceramic block having two open faces and an outer peripheral surface, the ceramic block having a plurality of cells divided by a cell wall and extending between the two open faces,
wherein the ceramic block has a plurality of honeycomb units combined by interposing an adhesive layer, the honeycomb units including an outer-peripheral-side honeycomb unit and a center-side honeycomb unit combined to form an outer peripheral part and a center part, respectively, of the ceramic block,
wherein the outer-peripheral-side honeycomb unit and the center-side honeycomb unit contain inorganic particles and at least one of inorganic fibers and whiskers,
wherein the outer-peripheral-side honeycomb unit has an outer peripheral cell wall forming an outer peripheral surface of the outer-peripheral-side honeycomb unit, the outer peripheral cell wall including an outermost peripheral cell wall forming a part of the outer peripheral surface of the ceramic block, and
wherein the outer-peripheral-side honeycomb unit includes an outermost peripheral cell positioned on an outer peripheral side of the ceramic block, the outermost peripheral cell including corner parts, and at least one corner part among the corner parts in contact with the outermost peripheral cell wall of the outer-peripheral-side honeycomb unit has a curved surface.

2. The catalyst carrier as claimed in claim 1,
wherein the center-side honeycomb unit has an outer peripheral cell wall forming an outer peripheral surface of the center-side honeycomb unit, and
wherein a cell of the center-side honeycomb unit in contact with the outer peripheral cell wall thereof has a corner part having a curved surface, the corner part being on a side contacting the outer peripheral cell wall.

3. The catalyst carrier as claimed in claim 2, wherein the center-side honeycomb unit has an interior cell wall not forming the outer peripheral surface thereof, the interior cell wall having a thickness in a range of approximately 0.1 mm through approximately 0.4 mm.

4. The catalyst carrier as claimed in claim 1, wherein the honeycomb units of the ceramic block have three kinds of shapes.

5. The catalyst carrier as claimed in claim 1, wherein the outermost peripheral cell wall has a uniform thickness.

6. The catalyst carrier as claimed in claim 1, wherein a cell of the outer-peripheral-side honeycomb unit in contact with the outer peripheral cell wall thereof has a corner part having a curved surface, the corner part being on a side contacting the outer peripheral cell wall.

7. The catalyst carrier as claimed in claim 1,
wherein the ceramic block has a cylindrical shape, and
wherein the outermost peripheral cell wall of the outer-peripheral-side honeycomb unit has a curved surface.

8. The catalyst carrier as claimed in claim 1, wherein the inorganic particles comprise at least one of alumina, silica, zirconia, titania, ceria, mullite, and zeolite.

9. The catalyst carrier as claimed in claim 8,
wherein the at least one of the inorganic fibers and the whiskers comprises at least one selected from the group consisting of alumina, silica, silicon carbide, silica alumina, glass, potassium titanate, and aluminum borate.

10. The catalyst carrier as claimed in claim 1, wherein the outermost peripheral cell wall has a thickness in a range of approximately 0.25 mm through approximately 0.50 mm.

11. The catalyst carrier as claimed in claim 1, wherein the outer-peripheral-side honeycomb unit has an interior cell wall not forming the outer peripheral surface thereof, the interior cell wall having a thickness in a range of approximately 0.1 mm through approximately 0.4 mm.

12. The catalyst carrier as claimed in claim 1, wherein a catalyst is carried thereon.

13. The catalyst carrier as claimed in claim 1, further comprising:
a coat layer provided on the outer peripheral surface of the ceramic block.

14. An exhaust gas treatment apparatus for a vehicle, said exhaust gas treatment apparatus comprising:
a catalyst carrier comprising:
a ceramic block having two open faces and an outer peripheral surface, the ceramic block having a plurality of cells divided by a cell wall and extending between the two open faces,
wherein the ceramic block has a plurality of honeycomb units combined by interposing an adhesive layer, the honeycomb units including an outer-peripheral-side honeycomb unit and a center-side honeycomb unit combined to form an outer peripheral part and a center part, respectively, of the ceramic block, wherein the outer-peripheral-side honeycomb unit and the center-side honeycomb unit contain inorganic particles and at least one of inorganic fibers and whiskers, wherein the outer-peripheral-side honeycomb unit has an outer peripheral cell wall forming an outer peripheral surface of the outer-peripheral-side honeycomb unit, the outer peripheral cell wall including an outermost peripheral cell wall forming a part of the outer peripheral surface of the ceramic block, and wherein the outer-peripheral-side honeycomb unit includes an outermost peripheral cell positioned on an outer peripheral side of the ceramic block, the outermost peripheral cell including corner parts, and at least one corner part among the corner parts in contact with the outermost peripheral cell wall of the outer-peripheral-side honeycomb unit has a curved surface;

a metal casing housing the catalyst carrier; and a holding seal material provided between the catalyst carrier and the metal casing and holding the catalyst carrier.

15. A catalyst carrier comprising:

a ceramic block having two open faces and an outer peripheral surface, the ceramic block having a plurality of cells divided by a cell wall and extending between the two open faces, wherein the ceramic block includes a plurality of outer-peripheral-side honeycomb units combined by interposing an adhesive layer so as to each form a part of the outer peripheral surface of the ceramic block, the outer-peripheral-side honeycomb units each having an outer peripheral cell wall forming an outer peripheral surface of the outer-peripheral-side honeycomb unit, the outer peripheral cell wall including an outermost peripheral cell wall forming the part of the outer peripheral surface of the ceramic block, wherein each of the outer-peripheral-side honeycomb units contains inorganic particles and at least one of inorganic fibers and whiskers, and wherein each of the outer-peripheral-side honeycomb units includes an outermost peripheral cell positioned on an outer peripheral side of the ceramic block, the outermost peripheral cell including corner parts, and at least one corner part among the corner parts in contact with the outermost peripheral cell wall of each of the outer-peripheral-side honeycomb units has a curved surface.

16. The catalyst carrier as claimed in claim 15, wherein the outermost peripheral cell wall has a uniform thickness.

17. The catalyst carrier as claimed in claim 15, wherein a cell of the outer-peripheral-side honeycomb unit in contact with the outer peripheral cell wall thereof has a corner part having a curved surface, the corner part being on a side contacting the outer peripheral cell wall.

18. The catalyst carrier as claimed in claim 15, wherein the ceramic block has a cylindrical shape, and wherein the outer-peripheral-side honeycomb unit has the outermost peripheral cell wall having a curved surface.

19. The catalyst carrier as claimed in claim 15, wherein the inorganic particles comprise at least one of alumina, silica, zirconia, titania, ceria, mullite, and zeolite.

20. The catalyst carrier as claimed in claim 19, wherein the at least one of the inorganic fibers and the whiskers comprises at least one selected from the group consisting of alumina, silica, silicon carbide, silica alumina, glass, potassium titanate, and aluminum borate.

21. The catalyst carrier as claimed in claim 15, wherein the outermost peripheral cell wall has a thickness in a range of approximately 0.25 mm through approximately 0.50 mm.

22. The catalyst carrier as claimed in claim 15, wherein the outer-peripheral-side honeycomb unit has an interior cell wall not forming the outer peripheral surface thereof, the interior cell wall having a thickness in a range of approximately 0.1 mm through approximately 0.4 mm.

23. The catalyst carrier as claimed in claim 15, wherein a catalyst is carried thereon.

24. The catalyst carrier as claimed in claim 15, further comprising:

a coat layer provided on the outer peripheral surface of the ceramic block.

25. An exhaust gas treatment apparatus for a vehicle, said exhaust gas treatment apparatus comprising:

a catalyst carrier comprising:

a ceramic block having two open faces and an outer peripheral surface, the ceramic block having a plurality of cells divided by a cell wall and extending between the two open faces, wherein the ceramic block includes a plurality of outer-peripheral-side honeycomb units combined by interposing an adhesive layer so as to each form a part of the outer peripheral surface of the ceramic block, the outer-peripheral-side honeycomb units each having an outer peripheral cell wall forming an outer peripheral surface of the outer-peripheral-side honeycomb unit, the outer peripheral cell wall including an outermost peripheral cell wall forming the part of the outer peripheral surface of the ceramic block, wherein each of the outer-peripheral-side honeycomb units contains inorganic particles and at least one of inorganic fibers and whiskers, and wherein each of the outer-peripheral-side honeycomb units includes an outermost peripheral cell positioned on an outer peripheral side of the ceramic block, the outermost peripheral cell including corner parts, and at least one corner part among the corner parts in contact with the outermost peripheral cell wall of each of the outer-peripheral-side honeycomb units has a curved surface;

a metal casing housing the catalyst carrier; and a holding seal material provided between the catalyst carrier and the metal casing and holding the catalyst carrier.

* * * * *